(12) United States Patent
Saari et al.

(10) Patent No.: US 7,239,889 B2
(45) Date of Patent: Jul. 3, 2007

(54) ANTENNA SYSTEM FOR GSM/WLAN RADIO OPERATION

(75) Inventors: Timo Saari, Tampere (FI); Ari Väisänen, Ruutana (FI); Marko Puupponen, Tampere (FI)

(73) Assignee: Nokia Corporation, Espoo (FI)

( * ) Notice: Subject to any disclaimer, the term of this patent is extended or adjusted under 35 U.S.C. 154(b) by 495 days.

(21) Appl. No.: 10/287,435

(22) Filed: Oct. 31, 2002

(65) Prior Publication Data

US 2003/0124982 A1    Jul. 3, 2003

(30) Foreign Application Priority Data

Oct. 31, 2001    (EP) ................... 01126010

(51) Int. Cl.
*H04M 1/00*    (2006.01)
*H03B 1/02*    (2006.01)
*H03C 1/62*    (2006.01)

(52) U.S. Cl. ............... 455/552.1; 455/553.1; 455/101; 455/115.1; 455/132; 455/140

(58) Field of Classification Search ........... 455/552.1, 455/553.1, 101, 115.1, 132, 133, 140, 272, 455/277, 423–425, 77–78, 82–83, 88
See application file for complete search history.

(56) References Cited

U.S. PATENT DOCUMENTS

| | | | |
|---|---|---|---|
| 5,337,316 A | | 8/1994 | Weiss et al. ............ 371/20.5 |
| 5,550,554 A | * | 8/1996 | Erkocevic ............... 343/828 |
| 5,710,984 A | * | 1/1998 | Millar et al. ............. 455/80 |
| 6,115,585 A | * | 9/2000 | Matero et al. ............. 455/78 |
| 6,125,107 A | * | 9/2000 | Johnson et al. ........... 370/241 |
| 6,127,986 A | * | 10/2000 | Wen et al. ................ 455/293 |
| 6,266,026 B1 | | 7/2001 | Stengel, Jr. .............. 343/791 |
| 6,509,877 B2 | * | 1/2003 | Masaki ..................... 375/347 |
| 6,510,310 B1 | * | 1/2003 | Muralidharan ............. 455/83 |
| 6,560,443 B1 | * | 5/2003 | Vaisanen et al. .......... 455/73 |
| 6,714,773 B1 | * | 3/2004 | Ishida ..................... 455/272 |

FOREIGN PATENT DOCUMENTS

| | | |
|---|---|---|
| EP | 0623967 | 11/1994 |
| EP | 0865169 | 9/1998 |
| EP | 0866588 | 9/1998 |
| EP | 0923158 | 6/1999 |
| EP | 0938158 | 8/1999 |
| EP | 1083622 | 3/2001 |
| GB | 2355155 | 4/2001 |
| WO | 0076095 | 12/2000 |
| WO | 0150636 | 7/2001 |
| WO | 0159938 | 8/2001 |

\* cited by examiner

*Primary Examiner*—Lana Le
*Assistant Examiner*—Wen Huang
(74) *Attorney, Agent, or Firm*—Ware, Fressola, Van Der Sluys & Adolphson

(57) ABSTRACT

An antenna system with two antennas provides the possibility to operate at least two different radio communication systems with one radio communication system operating on one single antenna of the antenna system and another radio communication system operating on both antennas of the antenna system wherein the antenna system serves as a diversity antenna system. This kind of antenna system is designed to be employed particularly in small devices with restricted measurements. Especially, an implementation of an antenna system for dual use of GSM/E-GSM/DCS operation and WLAN operation is presented.

6 Claims, 6 Drawing Sheets

Fig. 4a

| TEST-MODE | TST | WLAN | TX | SEL | SW-CTRL 301 | SW-CTRL 302 | SW-CTRL 303 |
|---|---|---|---|---|---|---|---|
| GSM | 1 | 0 | 0 | 0 | 1 | 0 | 0 |
| GSM | 1 | 0 | 1 | 0 | 1 | 0 | 0 |
| GSM | 1 | 0 | 0 | 1 | 1 | 0 | 0 |
| GSM | 1 | 0 | 1 | 1 | 1 | 0 | 0 |
| WLAN RX | 1 | 1 | 0 | 0 | 1 | 0 | 1 |
| WLAN RX | 1 | 1 | 0 | 1 | 1 | 0 | 1 |
| WLAN TX | 1 | 1 | 1 | 1 | 1 | 1 | 1 |
| WLAN TX | 1 | 1 | 1 | 0 | 1 | 1 | 1 |

Fig. 4b

| GSM/WLAN-MODE | | TST | WLAN | TX | SEL | SW-CTRL 301 | SW-CTRL 302 | SW-CTRL 303 |
|---|---|---|---|---|---|---|---|---|
| GSM | | 0 | 0 | 0 | 0 | 0 | 0 | 1 |
| GSM | | 0 | 0 | 1 | 0 | 0 | 0 | 0 |
| GSM/ WLAN RX | antenna 101 | 0 | 0 | 1 | 1 | 0 | 0 | 1 |
| GSM/ WLAN RX | antenna 102 | 0 | 0 | 0 | 0 | 0 | 0 | 0 |
| WLAN TX | | 0 | 1 | 1 | 1 | 0 | 0 | 1 |
| WLAN TX | | 0 | 1 | 1 | 0 | 0 | 1 | 1 |

| SIGNAL | VALUE | FUNCTION |
|---|---|---|
| TST | 0 | GSM/WLAN transceiver operation mode |
| | 1 | production test operation mode |
| WLAN | 0 | GSM mode |
| | 1 | WLAN mode |
| TX | 0 | receive mode |
| | 1 | transmit mode |
| SEL | 0 | GSM mode: only GSM operation<br>WLAN RX: Antenna 101 |
| | 1 | GSM mode: simultaneous operation GSM / WLAN RX<br>WLAN RX: Antenna 102 |

Fig. 5a

| CTRL | VALUE | SWITCH SETTING |
|---|---|---|
| 301 | 0 | 301.1 and 301.2 connected; 301.3 disconnected |
| | 1 | 301.1 and 301.3 connected; 301.2 disconnected |
| 302 | 0 | 301.1 and 302.2 connected; 302.3 disconnected |
| | 1 | 302.1 and 302.3 connected; 302.2 disconnected |
| 303 | 0 | 303.1 and 303.2 connected; 303.3 disconnected |
| | 1 | 303.1 and 303.3 connected; 303.2 disconnected |

Fig. 5b

ANTENNA SYSTEM FOR GSM/WLAN RADIO OPERATION

BACKGROUND OF THE INVENTION

1. Technical Field

The present invention is related to an antenna system to operate on different radio frequencies. Particularly, the present invention is related to an antenna system for GSM and WLAN radio operation.

2. Discussion of Related Art

Mobile communication techniques have brought and will bring to the marketplace new, versatile communication models in which new requirements are placed on multi frequency antenna assemblies not only operating in the mobile communication network according to the different radio frequencies of the Global System for Mobile communication (GSM) but also operating on other wireless communication standards and therefore other frequencies, for example wireless local area network (WLAN) according to WLAN 802.11b standard. Both GSM and WLAN communication are used for wireless data communication, wherein so called enhanced GSM (E-GSM) standard has been mentioned comprising GSM packet radio system (GPRS), high speed circuit switched data HSCSD or further enhanced data rate for GSM evolution (EDGE). A related mobile communication system according to GSM has additionally to be taken into account which is called Global Digital System for mobile communication (DCS).

GSM based mobile communication operates on different GSM frequencies wherein 900 MHz and 1.8 GHz are generally the two important ones but the related DCS communication frequency at 1.9 GHz has also to be considered. Antennas able to operate on the different GSM communication frequencies are realised and available.

Documents EP 0 923 158 and EP 0 938 158 shall only be referenced as the documents disclose multi resonant frequency antennas employable for GSM communication. The antennas are not suitable for operating on the ISM frequency band.

WLAN 802.11b mobile communication is a wireless communication standard to cover local areas to supply wireless access to a local area network, e.g., of a company. This standard uses a radio frequency at 2.4 GHz utilising the so-called industrial, scientific and medical (ISM) band. Generally, WLAN communication requires a system of two antennas, so called diversity antenna system to improve above all the receiving performance. The operating wavelength of WLAN communication is sufficiently short to accommodate conveniently small geometries available in planar antenna elements. In WLAN applications, an indoor environment is typically encountered wherein the propagation of radio waves from one point to another can be greatly affected by the surrounding structures of office areas, and activities taking place within the office area. Due to these effects diversity antennas are used to overcome the problem. Diversity antennas are distinguished by antennas placed in different and favourable positions often orientated in different directions, preferably arranged perpendicularly to each other.

Antennas for operating wireless communication according to the above mentioned wireless communication standard are state of the art and implemented in several devices in a great variety of designs. To provide a dual mode device able to use GSM data communication and WLAN data communication it would be an easy and fast way to combine devices according to the different standards. But this way of implementation is limited due to the fact that implementation of an E-GSM/DCS antenna and a WLAN/ISM diversity antenna system comprising two additional antennas is not possible since wireless communication is generally used in mobile devices which are restricted in size and weight. Additionally, the usage of two completely independent units for E-GSM/DCS communication and WLAN communication is cost-intensive, has an undesired high electrical power consumption and an undesired shape.

Particularly, the design of an interface card according to the personal computer memory card international association (PCMCIA) or the following interface standard distinguished as PCCARD used preferably in mobile terminals like mobile computers, personal digital assistant terminals (PDA) or the like puts high demands on size, shape, power consumption, mechanical durability and costs so that the implementation of two radio systems is not reliable.

The document EP 1 083 622 describes a switching circuit for multi-transceivers. The switching circuit allows to connect a plurality of transceivers to a antenna system operating in different operation modes. Herein, the antenna system consisting of two antennas. A first operation mode operates one transceiver in combination with one antenna of the system, a second operation mode operates a second transceiver in combination with the antenna system as a diversity antenna system and in a third operation mode the allows to operate one transceiver in combination with one antenna and the other transceiver in combination with the other antenna of the antenna system. The switching circuit is designed to operate transceivers transceiving on the same radio frequency band, herein particularly the 2.4 GHz ISM (industrial, scientific and medical) band. For that reason, the antennas of the antenna system coupled to the antenna switching circuit are identically and only designed for operating on a common resonant frequency. A combination of different antennas providing different resonant frequency is not intended. Further, the switching circuit does not provide a common production test RF interface in order to test and tune the transceivers.

Further, the document EP 0 623 967 describes a dual antenna diversity system for WLAN consisting of two L-shaped PIFA antennas. In that disclosure a single pole double throw switch (SPDT) is employed to effect the switching between the two antennas in a receive mode and for switching to only one of the two antennas for operation of the apparatus in a transmit mode. The respective switching is designed for operating only a WLAN transceiver and not designed with regard to the operation of a plurality of transceivers sharing the antenna system.

Moreover, the document EP 0 866 588 describes also a antenna switch and filter arrangement to operate a single transceiver. Again, no antenna sharing of a diversity antenna system is presented. The operation of WLAN transceivers in combination with diversity antenna system is state of the art and very popular, especially for operating WLAN interface adapters according to the PCCARD or PCMCIA standard.

DISCLOSURE OF INVENTION

A first object of the invention is to provide a high quality production tuning and testing RF interface implemented in an antenna switching circuit to tune the transceiver units connected to an antenna system comprising two antennas wherein at least one transceiving unit associated with one radio communication system uses a first antenna of the antenna system and a least another transceiving unit associated with another radio communication system uses both antennas of the antenna system as a diversity antenna system. A circuit for switching and controlling the antenna system is connected to the at least two different transceiving units and the antenna assembly of the first and the second antenna of the antenna system to switch between the operation modes used for operating the transceiving units with the antenna assembly. The circuit for switching and controlling the antenna system comprises the high quality production tuning and testing RF interface in a preferable manner.

Also, a method of operating such an antenna system should be provided.

A second object of the invention is to provide an antenna system comprising two antennas wherein at least one transceiving unit associated with one radio communication system uses a first antenna of the antenna system and a least another transceiving unit associated with another radio communication system uses both antennas of the antenna system as a diversity antenna system, wherein a diplex filter unit is used to split signals received by the first antenna and pass the separated signals according to their frequency to the first or the second transceiving unit connected to the antenna system.

The first object is attained according to the present invention by a transceiving antenna system which comprises a first antenna, a second antenna and a controlling circuit to operate a first transceiving unit and a second transceiving unit, wherein the first antenna is operated in combination with said second antenna in a first operational mode to serve as a diversity transceiving antenna system for the first transceiving unit, the first antenna is operated in a second operational mode to serve as a single transceiving antenna for the second transceiving unit, wherein the controlling circuit selectively connects the first antenna and the second antenna to the first transceiving unit operating in said first operational mode, only the first antenna with the second transceiving unit in second operational mode, and wherein a testing interface is provided for operating testing modes, wherein the controlling circuit selectively connects the testing interface to the first transceiving unit in a first testing mode and the testing interface to the second transceiving unit in a second testing mode. A transceiving antenna system having first and second antennas and a control circuit to operate first and second transceiving units is given by document EP 0 623 967. A method for operating such an antenna system, according to the present invention, comprises the steps of operating the first antenna in combination with the second antenna in a first operational mode to serve as a diversity transceiving antenna system for the first transceiving unit, operating the first antenna in a second operational mode to serve as a single transceiving antenna for the second transceiving unit, selectively connecting the first antenna and the second antenna to the first transceiving unit operating in the first operational mode, selectively connecting only the first antenna with the second transceiving unit in the second operational mode, and further comprising a testing step for operating testing modes, wherein the controlling circuit selectively connects the testing interface to the first transceiving unit in a first testing mode and the testing interface to the second transceiving unit in a second testing mode.

The second object is attained according to the present invention by at transceiving antenna system comprising a first antenna, a second antenna and a controlling circuit to operate a first transceiving unit and a second transceiving unit, wherein the first antenna is operated in combination with the second antenna in a first operational mode to serve as a diversity transceiving antenna system for the first transceiving unit, the first antenna is operated in a second operational mode to serve as a single transceiving antenna for the second transceiving unit, wherein the controlling circuit selectively connects the first antenna and the second antenna to the first transceiving unit operating in the first operational mode, only the first antenna with the second transceiving unit in the second operational mode, and wherein a diplex filtering unit is provided which is interconnected between the first antenna and the first transceiving unit and said second transceiving unit. A transceiving antenna system comprising first and second antennas and a control circuit to operate first and second transceiving units is given by document EP 0 623 967. A method for operating such an antenna system wherein the first antenna is operated in combination with the second antenna in a first operational mode to serve as a diversity transceiving antenna system for the first transceiving unit, the first antenna is operated in a second operational mode to serve as a single transceiving antenna for the second transceiving unit, wherein the controlling circuit selectively connects the first antenna and the second antenna to the first transceiving unit operating in the first operational mode, only the first antenna with the second transceiving unit in the second operational mode, and wherein a diplex filtering unit is provided which is interconnected between the first antenna and the first transceiving unit and the second transceiving unit.

According to the first aspect, the basic idea of the present invention is to provide a high quality production tuning and testing RF interface implemented in an antenna switching circuit. The antenna switching circuit controls the connection of the two antennas of an antenna system to the transceiving units wherein the first antenna serves as an antenna for operating at least two different transceiving units suitable for mobile radio communication. The first antenna of the antenna system serves as a single antenna for transceiving of both transceiving units, whereas the second antenna serves as antenna for only the one transceiving unit. The antenna system may also serve as a diversity antenna system for one transceiving unit.

The tuning and testing of the transceiving units is especially necessary for high power transceiving units like WLAN transceivers or E-GSM/GSM transceivers or DCS transceivers. Therefore, it is important to implement a high quality production tuning and testing RF interface in a preferable manner within the switching circuit of the antenna system. The implementation of the high quality production tuning and testing RF interface according to the invention provides a cheap way to enable the tuning and testing of the transceiving units by only one high quality production tuning and testing RF interface. Therefore, the switching circuit of the antenna system provides two testing operation mode wherein the production tuning and testing RF interface is selectively connected to the first transceiving unit of the second transceiving unit of the antenna system.

Advantageously, a common production tuning and testing RF interface may enable to design a layout of the antenna switching circuit which is compact and of a reasonable price. The requirements to the size of an antenna system according to an embodiment of the invention are high, particularly if the antenna system has to be implemented in a mobile terminal/device or a device connectable to a mobile terminal/device. The implementation of several production tuning and testing RF interfaces for each transceiving unit may not be possible if the size of the housing is limited by external conditions. For example, the size of a PCMCIA/PCCARD is standardised and embedded units therein has to fit into the corresponding housing. Moreover, the production testing and tuning process is considerably fastened. The testing and tuning equipment has only to be plugged to one designated production tuning and testing RF interface to test and tune all connectable transceiving units of the respective antenna switching circuit.

It shall be understood that the first and the second transceiving unit can comprise several transceiving units. Both transceiving units can be carried out to operate several different radio communication systems wherein the first transceiving unit comprises transceiving units for operating radio communication systems which require diversity antenna systems for proper function and the second transceiving unit comprises transceiving units for operating radio communication systems which require only single antennas for proper operation. Also, the transceiving units can be designed as multi frequency transceiving units. As an example, the first transceiving unit can be a transceiving unit for operating a WLAN transceiver which requires a diversity antenna system. The second transceiving unit can comprise a E-GSM/GSM transceiver and/or a DCS transceiver and/or the like and therefore also the different data transmission standards like GPRS, HSCSD, EDGE or the like. The antennas have to be designed to operate the frequencies according to the connected transceiving units, i.e., the first antenna has to be designed able to radiate efficiently at the frequencies of the first and the second transceiving unit. The second antenna is only used by the first transceiving unit and has to be designed accordingly.

Preferably, the controlling circuit necessary for the operation of the antenna system of the present invention comprises in an embodiment a first, a second and a third switching unit. The first switching unit is connected with the first transceiving unit, the second switching unit and the second antenna. The second switch is connected with the second transceiving unit, the first switch and the third switching unit. The third switching unit is connected to the second switching unit, the production tuning and testing RF interface and the first antenna. Moreover, the first transceiving unit may be connected through the first, the second and the third switching unit to the production tuning and testing RF interface according to the first testing mode. The second transceiving unit may be connected through the second and the third switching unit to the production tuning and testing RF interface according to the second switching mode.

Switching units are power consuming devices, so that the reduction of such devices is advantageous for mobile terminal/devices powered by batteries or accumulators. Moreover, the logic circuitry performing the control of the switching units according to the operation mode can be designed in a simpler way in case of fewer switching units. At the same time, the diplex filtering unit may be used to prepare the signals received by the antenna and may enable to reduce the number of filtering unit comprised by the transceiving units. This may reduce the number of RF components which may increase the amplitude of the received RF signals in order to simplify the design of the transceiving units and/or the enhance the quality or sensitivity of receiving and/or the transmitting. Since RF components are expensive, a low number of RF components may be desirable.

Additionally, a diplex filter unit may be provided for switching signals according to the transceiving units. The diplex filter unit enables to separate signals passing through the diplex filter via a common port to two separate ports according to their frequency. The implementation of a diplex filter in a antenna switching circuit provides the possibility to replace a RF switching unit with this diplex filter unit wherein the diplex filter unit has not to be controlled by a separate switching control circuit and therefore simplifies the circuit and switching thereof.

Preferably, controlling circuit necessary for the operation of the antenna system of the present invention comprises in a further embodiment a first, a second switching unit and a diplex filter unit. The diplex filter unit is connected to the second transceiving unit, the first switching unit and the second switching unit. The first switching unit is connected to the first transceiving unit, to the second antenna and the diplex filter unit. The second switching unit is connected to the diplex filter unit, the production tuning and testing RF interface and the first antenna. Moreover, the first transceiving unit may be connected through the first switching unit, the diplex filter unit and the second switching unit to the production tuning and testing RF interface according to the first testing mode. The second transceiving unit may be connected through the diplex filter unit and the second switching unit to the production tuning and testing RF interface according to the second switching mode.

Conveniently, the first transceiver unit may comprise a receiving subunit and a transmitting subunit separately connected to the switching circuit of the antenna system. Therefore, the switching circuit comprise a first, a second, a third switching unit and a diplex filter unit. The first switching unit is connected to the receiving subunit of the first transceiving unit, said second switching unit and said second antenna. The second switching unit is connected to said first switching unit, the transmitting subunit of the first transceiving unit and the diplex filtering unit. The diplex filtering unit is connected to the second switching unit, said second transceiving unit and said third switching unit. The third switching unit is connected to the diplex filtering unit, the production tuning and testing RF interface and the first antenna. Moreover, the transmitting unit of the first transceiving unit may be connected through the first switching unit, the second switching unit, the diplex filter unit and the third switching unit to the production tuning and testing RF interface according to the first testing mode. The receiving unit of the first transceiving unit may be connected through the second switching unit, the diplex filter unit and the third switching unit to the production tuning and testing RF interface according to the first testing mode. The second transceiving unit may be connected through the diplex filter unit and the third switching unit to the production tuning and testing RF interface according to the second switching mode.

According to the second aspect, the basic idea of the present invention is to provide a diplex filter unit implemented in an antenna switching circuit. The antenna switching circuit controls the connection of the two antennas of an antenna system to the transceiving units wherein the first antenna serves as an antenna for operating at least two different transceiving units suitable for mobile radio communication. The first antenna of the antenna system serves as a single antenna for transceiving of both transceiving units, whereas the second antenna serves as antenna for only the one transceiving unit. The antenna system may also serve as a diversity antenna system for one transceiving unit. The diplex filter unit enables to separate signals passing through the diplex filter via a common port to two separate ports according to their frequency. The implementation of a diplex filter in a antenna switching circuit provides the possibility to replace a RF switching unit with this diplex filter unit wherein the diplex filter unit has not to be controlled by a separate switching control circuit and therefore simplifies the circuit and switching thereof.

Preferably, controlling circuit necessary for the operation of the antenna system of the present invention comprises in a further embodiment a first switching unit and a diplex filtering unit. The diplex filtering unit is connected to the second transceiving unit, the first switching unit and the first antenna. The first switching unit is connected to the first transceiving unit, the second antenna and the diplex filtering unit.

It shall be understood that all of the switches employed in the circuit can be realised by employing any electrical element such as means for switching connections between further elements of the circuit. It is advisable to employ electrical filter elements and the like as means for switching. Preferably, the at least one of the switching units comprises a single pole double throw (SPDT) switch. More preferably, the diplex filter unit may be a ceramic filter in order to minimise the loss of signal amplitude.

Additional electrical and electronic elements can be interposed in this basic circuit to enhance, improve or modify the circuit. The present invention introduces a basic concept of switching several transceiving units which support different radio communication standards to the antenna assembly of the present invention to be operated as a single antenna or as a diversity antenna system. It will be apparent to persons skilled in the art that circuits comprising additional elements shall be covered by this invention since the introduction of additional elements does not change the virtue and scope of this invention, particularly the concept of operating the antenna system.

Preferably, the antennas of the antenna systems are arranged in such a way that the combined operation of the antennas as a diversity antenna system serves as a spatially separated diversity antenna system. The distance of the spatial separation is dependent on the frequency or frequencies of the first transceiving unit. Generally, the distance is minimal at about the half of the wavelength of the operation frequency to be able to select the antenna placed at a privileged position when strong interference occurs.

Conveniently, the feed point of said first antenna or main antenna, respectively, is placed substantially in the middle of the antenna so that the antenna is divided into portions wherein one portion of the first antenna is used for the first transceiving unit which requires only a single antenna for radio communication operation and wherein the other portion of the first antenna is used for the second transceiving unit which requires a diversity antenna system for reliable radio communication operation.

Additionally, said antenna system is arranged in such a way that the longitudinal axis of the two separated antennas are directed in different directions, preferably are arranged substantially perpendicularly to each other.

More preferably, the antenna system is arranged on a printed wired board, e.g., as meander shaped antennas wherein the longitudinal axis is placed parallel to the surface of the printed wired board and the meander shaped antennas are arranged in a flat space-saving manner. Additionally, the antennas of the antenna system are placed on the same side of the printed wired board.

More conveniently, the printed wired board is made of a dielectric material, most conveniently made of FR4 dielectric substrate material.

Advantageously, to minimise losses caused by the dielectric substrate material of the printed wired board the antennas of the antenna system are arranged near or close to the edges of the printed wired board. More advantageously, the antennas are arranged on the printed wired board near the edges and the ends of the antenna extend to its corners as far as possible.

Preferably, the main antenna operated as a single antenna is used for radio communication systems according to the GSM and/or E-GSM standard. Additionally, it is possible to support radio communication according to the DCS standard. Also, future standards can be supported. The main antenna is adapted to operate the respective frequencies of the supported radio communication standards.

Conveniently, the antenna system serving as a diversity antenna system is used for operating radio communication systems according to the WLAN 802.11b standard. Both antennas are adapted to operate on the WLAN/ISM band.

According to the method versions of the above mentioned first and second aspects there are provided all steps necessary for operating the single units disclosed.

BRIEF DESCRIPTION OF THE DRAWINGS

The accompanying drawings are included to provide a further understanding of the invention, and are incorporated in and constitute a part of this specification. The drawings illustrate embodiments of the present invention and, together with the description, serve to explain the principles of the invention. In the drawings, FIG. 4a shows a logic table of the logic circuit diagram in the production test mode according to FIG. 3, FIG. 4b shows a logic table of the logic circuit diagram in operation mode according to FIG. 3, FIG. 5a illustrates the signal description associated with the logic circuit diagram according to FIG. 3, FIG. 5b illustrates switch settings for the switching units of FIG. 2 with binary control values associated with the logic circuit diagram according to FIG. 5a and the signal description of FIG. 3.

BEST MODE FOR CARRYING OUT THE INVENTION

Figure 1A:
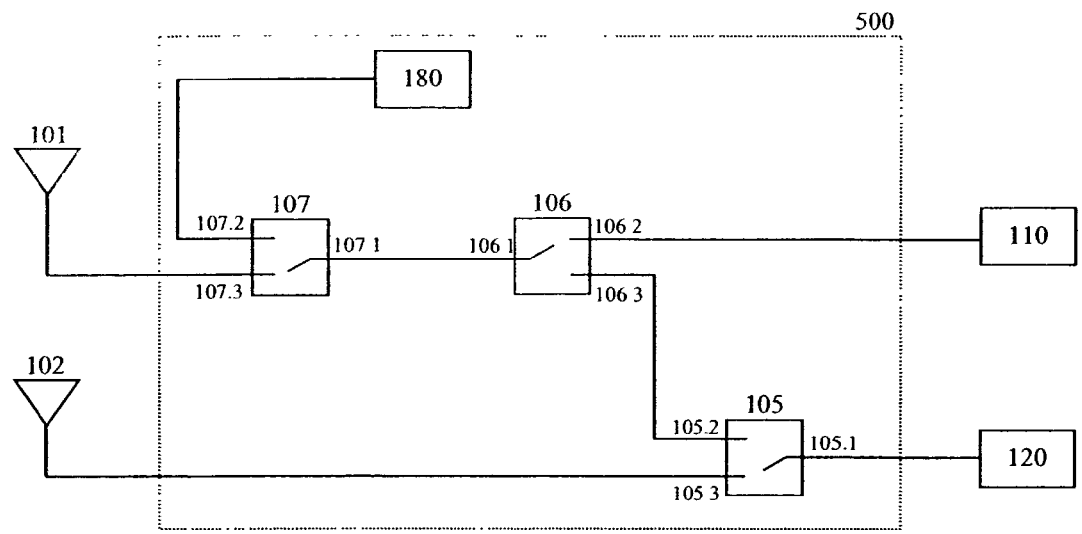
FIG. 1a shows a schematic block diagram illustrating the arrangement of the antenna system, an antenna switching circuit and the transceiving units according to a first embodiment of the invention.

Reference will now be made in detail to the presently preferred embodiments of the invention, examples of which are illustrated in the accompanying drawings. Wherever possible, the same reference numbers are used in the drawings and the description to refer to the same or like parts.

The basic idea of the following embodiments according to the invention is to provide an antenna switching circuit and an antenna system which can be operated as diversity antenna system such as operated for WLAN transceivers wherein one of the antennas of the antenna system can be operated also for a different transceiver such as E-GSM/GSM transceivers. The different radio frequencies used to operate the different communication standard involve the employment of different antennas. For example, both antennas have to be operable on the ISM band corresponding with WLAN radio frequency but also at least one antenna of the antenna system has to be operable on the different E-GSM/GSM and/or DCS frequencies. Moreover, transceivers of high transmitting power and have to be tuned and tested during production in order to operate properly. Therefore, the antenna switching circuit provides a common production test RF interface which can be used for functional testing and tuning needs of all coupled transceivers. Production test RF interfaces are expensive and spatially extended components. Hence, the implementation of a common production test RF interface for all transceivers is advantageous.

FIG. 1a shows a schematic block diagram illustrating the arrangement of the antenna system, including two antennas 101, 102, an antenna switching circuit 500 and two transceiving units 110, 120, according to a first embodiment. As mentioned, the antenna system consists of two single antennas including a first antenna 101 and a second antenna 102. The two transceivers may include a second transceiver 110 and a first transceiver 120 that may each be coupled to the antenna switching circuit. The first antenna 101 may be designed to operate as transmitting (TX) and receiving (RX) antenna for the second transceiving unit 110 or the first transceiving unit 120 and the second antenna 102 may be designed to operate as both transmitting (TX) and receiving (RX) antenna for the first transceiving unit 120.

The antenna switching circuit may comprise the first, second and third switching units 105, 106 and 107. The switching units may be implemented as single pole double throw switches (SPDT). Additionally, the antenna switching circuit may comprise a common production test RF interface 180 used for testing and tuning the coupled second and first transceiving units 110 and 120 during production. The switching units 105, 106 and 107 may be controlled by a switching control circuit 190 (not shown).

Preferably, the first switching unit 105 is connected via port 105.1 to second transceiving unit 120, via port 105.2 to port 106.3 of second switching unit 106 and via port 105.3 to second antenna 102. The second switching unit 106 is connected via port 106.1 to port 107.1 of third switching unit 107, via port 106.2 to second transceiving unit 110 and via port 106.3 to the port 105.2 of first switching unit 105. The third switching unit 107 is connected via port 107.1 to port 106.1 of second switching unit 106, via port 107.3 to first antenna 101 and via port 107.2 to production test RF interface 180.

The not shown switching control circuit 190 may control the connection state of the switching units and therefore the switching control circuit 190 may enable to operate the antenna switching circuit 500 in different operational modes.

A testing operational mode may be used for testing and tuning the coupled second and first transceiving units 110 and 120. The production test RF interface 180 may be implemented as a mechanical RF connector. Devices for testing and tuning may be connected to the antenna switching circuit 500 via the production test RF interface 180. The third switching unit 107 is switched to connect port 107.1 to port 107.2. The port 107.3 is disconnected and thereupon also first antenna 101. The second transceiving unit 110 may be connected to the production test RF interface 180 by second switching unit 106 to connect port 106.1 and port 106.2. First transceiving unit 120 may be connected with the production test RF interface 180 by first switching unit 105 to connect port 105.1 and port 105.2 and second switching unit 106 to connect port 106.3 and port 106.1. Testing and tuning of both second and first transceiving units 110, 120 may be performed. The switching of the first and second switching units 105 and 106 allows to connect exclusively one of the both transceiving units to the production test RF interface. Preferably, the switching of the first, second and third switching units 105, 106 and 107 may be controlled by a switching control circuit. More preferably, the third switching unit 107 is controlled directly by the production test RF interface, for example, in case of plugging in a mechanical plug into the production test RF interface 180, the third switching unit 107 is switched to connect port 107.1 and port 107.2. If no corresponding plug is connected to the production test RF interface 180, the third switching unit 107 is switched to the default switching state connecting port 107.1 and port 107.3.

The following operation modes will describe operational modes of the antenna switching circuits related to transmitting and receiving operation modes of the coupled second and first transceiving units 110 and 120. During operation in the following operational modes, third switching unit 107 is switched permanently to connect port 107.1 and port 107.3. Third switching unit 107 is employed to implement the production test RF interface 180 and is therefore not involved in the switching state of the switching units used to establish the operational modes of the antenna switching circuit related to transmitting and receiving operational modes.

A first operational mode may be used to operate transmitting and receiving of second transceiving unit 110. Therefore, second switching unit 106 has to be switched to connect port 106.1 and port 106.2. Port 106.3 is disconnected and hence also the first transceiving unit 120. As a result, the second transceiving unit 110 is connected through second switching unit 106 and third switching unit 107 to the first antenna 101 and hence the second transceiving unit 110 may transmit and receive by using the first antenna 101 of the antenna system. Preferably, the first transceiving unit 120 is disconnected from the second antenna 102 at the same time. This may be realised by switching the first switching unit 105 to connect port 105.1 and port 105.2. Consequently, the second antenna 102 is disconnected from any transceiving unit. Transmitting and receiving of the second transceiving unit 110 may be operated undisturbed from the first transceiving unit 120.

A second operational mode may be used to operate transmitting and receiving of the first transceiving unit 120 coupled to the second antenna 102. Accordingly, the first switching unit 105 has to be switched to connect port 105.1 and port 105.3. As a result, first transceiving unit 120 and second antenna 102 are connected through first switching unit 105. The first transceiving unit 120 may transmit and receive using second antenna 102. Preferably, second transceiving unit 110 may be disconnected from the first antenna 101. This may be realised by switching second switching unit 106 to connect port 106.1 and port 106.3. Consequently, no connection is established between second transceiving unit 110 and first antenna 101. The disconnection of second transceiver 110 may ensure an undisturbed operation of first transceiver 120 connected by the antenna switching circuit 500 to second antenna 102.

Alternatively, first transceiving unit 120 may be operated in combination with first antenna 101. Therefore, first transceiving unit 120 and first antenna 101 have to be connected through first, second and third switching units 105, 106 and 107. Therefore, first switching unit 105 is switched to connect port 105.1 and port 105.2. Further, second switching unit 106 has to be switched to connect port 106.3 and port 106.1 of second switching unit 106. Third switching unit 107 is switched by default to connect port 107.1 and port 107.3. Accordingly, this switching state establishes a connection between first transceiving unit 120 and first antenna 101. Since port 106.2 of second switching unit 106 is disconnected, second transceiving unit 110 is unconnected from both the first and second antennas 101 and 102. The disconnection of the second transceiver 110 may ensure an undisturbed operation of first transceiver 120 connected by the antenna switching circuit 500 to the first antenna 101.

The second operational mode enables to connect first transceiving unit 120 either to first antenna 101 or second antenna 102 and operates therefore the antenna system as a diversity antenna system. The operation of a diversity antenna system is advantageously operated for WLAN transceiving units for receiving due to the intensity differences at different places. The usage of two antennas arranged at different places increases the probability to receive signals transmitted by WLAN transceiving units of sufficient high amplitude. Preferably, the antennas of a diversity antenna system are arranged sufficiently perpendicular to one another since this arrangement may improve the receiving performance.

Usually, WLAN transceiving units transmit signals using a single antenna since the power of WLAN transceiving units for transmitting is high enough and only be limited by type approval limits for transmitting power.

A third operational mode may be used to operate transmitting and receiving of the second transceiving unit 110, whereas first transceiving unit 120 may be operated as receiver unit. In order to establish connections to operate this third operational mode, first switching unit 105 has to be switched to connect port 105.1 and port 105.3. Accordingly, first transceiving unit 120 is connected to second antenna 102. At the same time, second switching unit 106 is switched to connect port 106.2 and port 106.1. Correspondingly, second transceiving unit 110 is connected to first antenna 101 via second and third switching units 106 and 107. Of course, third switching unit 107 is switched to the default state connecting port 107.1 and port 107.3. This third operational mode may enable transmitting and receiving of both transceiving units at the same time, in case of a low signal coupling between the first and second antennas 101 and 102 especially transmitting signals for transmitting and receiving of the second transceiving unit 110 coupled to the first antenna 101 and receiving of first transceiving unit 120 coupled to second antenna 102. Of course, the advantage of a diversity antenna system to improve receiving of the first transceiving unit 120 cannot be used in this operational mode. The operation of first transceiving unit 120 is limited to single second antenna 102. Since second transceiving unit 110 can only be connected to first antenna 101 using antenna switching circuit 500, the operation of the second transceiving unit 110 is not limited in this third operational mode.

The states of the switching units may be controlled by the switching control circuit with respect to the different operational modes.

Figure 1B:
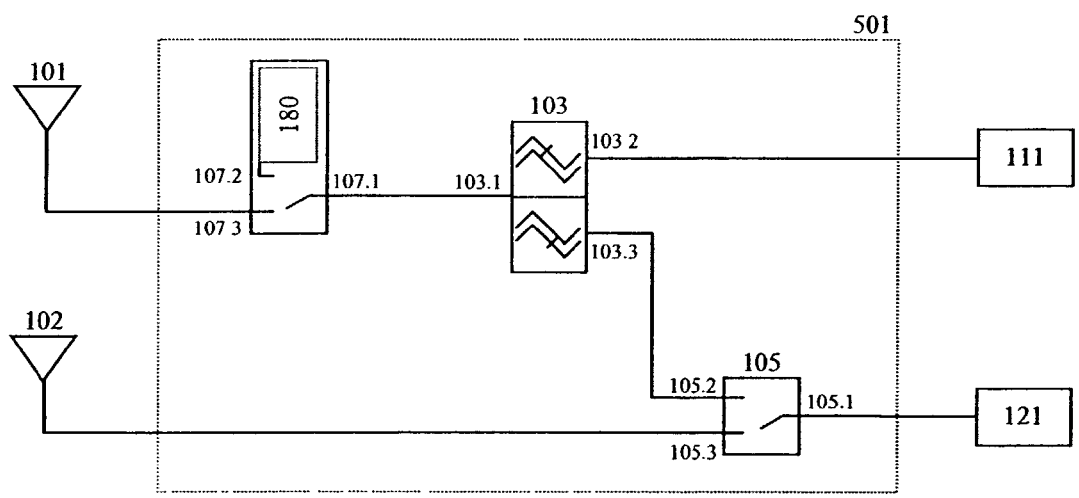
FIG. 1b shows a schematic block diagram illustrating the arrangement of the antenna system, an antenna switching circuit and transceiving units according to a second embodiment of the invention.

The following FIG. 1*b* shows a modified antenna switching circuit. FIG. 1*b* shows a schematic block diagram illustrating the arrangement of the antenna system, an antenna switching circuit and transceiving units according to a second embodiment of the invention. The antenna system consists of two single antennas, a first antenna 101 and a second antenna 102 which may coupled to the antenna switching circuit 501. Further, two transceivers, a second transceiving unit 111 and a first transceiving unit 121 may be coupled to the antenna switching circuit. The first antenna 101 may be designed to operate as transmitting (TX) and receiving (RX) antenna for the second transceiving unit 111 or the first transceiving unit 121, and the second antenna 102 may be designed to operate as transmitting (TX) and receiving (RX) antenna for the first transceiving unit 121.

The transceiving units 111 and 121 may be operated on different frequencies wherein second transceiving unit 111 operates on lower radio frequencies in comparison to first transceiving unit 121 operating on higher radio frequencies. It shall be noted that transceiving units 111 and 121 may each operate on single different radio frequencies. For example, second transceiving unit 111 may be an E-GSM/GSM/DCS transceiving unit. Accordingly, an E-GSM/GSM/DCS transceiving unit may operate on radio frequencies 0.9 GHz, 1.8 GHz and 1.9 GHz wherein the first two radio frequencies are used to operate E-GSM/GSM radio communication and the third radio frequency is used to operated DCS radio communication. First transceiving unit 121 may be a WLAN transceiving unit operating on the ISM band at 2.4 GHz.

The antenna switching circuit may comprise a first switching unit 105 and an integrated, second switching unit 107. The switching units may be implemented as single pole double throw switches (SPDT). Additionally, the antenna switching circuit may comprise a common production test RF interface 180 used for testing and tuning the coupled transceiving units 111 and 121 during production. The second switching unit 107 and the production test RF interface 180 may be implemented as a single integrated component in the antenna switching circuit 501 and the second switching unit 107 may be operated by the production test RF interface 180. The first switching unit 105 may be controlled by a switching control circuit 191 (not shown).

Moreover in comparison to FIG. 1*a*, the second switching unit 106 of FIG. 1*a* is replaced with a signal splitting device, particularly a frequency diplex filtering unit 103. The diplex filtering unit 103 splits signals according to their frequency, i.e., signals at the port 103.1 are filtered such that signals of low frequency are passed through to port 103.2 and signals of high frequency are passed through to port 103.3. Diplex filtering units are a combination of a high pass filtering unit and a low pass filtering unit each equipped with a separate connecting port. Signals at port 103.1 pass a low pass filtering unit to port 103.2 wherein signals pass a high pass filtering unit to port 103.3. The properties of the low pass filtering unit and the high pass filtering unit included in the diplex filtering unit 103 have to be adapted to the respective radio frequencies of the transceiving units 111 and 121.

Preferably, the first switching unit 105 is connected via port 105.1 to first transceiving unit 121, via port 105.2 to port 103.3 of diplex filtering unit 103 and via port 105.3 to second antenna 102. The diplex filtering unit 103 is connected via port 103.1 to port 107.1 of integrated switching unit 107, via port 103.2 to second transceiving unit 111 and via port 103.3 to the port 105.2 of first switching unit 105. The integrated switching unit 107 is connected via port 107.1 to port 103.1 of diplex filtering unit 103, via port 107.3 to first antenna 101 and via port 107.2 internally to production test RF interface 180.

The switching control circuit 191 may control the connection state of the switching units and therefore the switching control circuit 191 may enable to operate the antenna switching circuit 501 in different operational modes.

A testing operational mode may be used for testing and tuning the coupled transceiving units 111 and 121. The production test RF interface 180 may be implemented as a mechanical RF connector and integrates the switching unit 107 which is only operated during testing and tuning. Devices for testing and tuning may be connected to the antenna switching circuit 501 via the production test RF interface. The switching unit 107 is switched to connect port 107.1 to port 107.2. The port 107.3 is disconnected and thereupon also first antenna 101. The second transceiving unit 111 may be connected to the production test RF interface 180 through diplex filtering unit 103 via port 103.2 and port 103.1. Signals intended for second transceiving unit 111 or signals generated by second transceiving unit 111 may pass the diplex filtering unit 103 via port 103.2 and port 103.1. First transceiving unit 121 may be connected with the production test RF interface 180 by first switching unit 105 to connect port 105.1 and port 105.2 and is passed through diplex filtering unit 103 via port 103.3 and port 103.1. Signals intended for first transceiving unit 121 or signals generated by first transceiving unit 121 may pass the diplex filtering unit 103 via port 103.3 and port 103.1. Testing and tuning of both second and first transceiving units 111 and 121 may be performed.

Preferably, the switching of the switching units 105 and 107 may be controlled by a switching control circuit. More preferably, the integrated switching unit 107 is controlled directly by the production test RF interface 180, for example, in case of plugging in a mechanical plug into the production test RF interface 180 integrated switching unit 107 is switched to connect port 107.1 and port 107.2. If no corresponding plug is connected to the production test RF interface 180 the integrated switching unit 107 is switched to the default switching state connecting port 107.1 and port 107.3.

The following operational modes will be described as operational modes of the antenna switching circuits related to transmitting and receiving operational modes of the coupled second and first transceiving units 111 and 121. During the transceiving unit operation integrated switching unit 107 is switched permanently to connect port 107.1 and port 107.3. Integrated switching unit 107 is employed to implement the production test RF interface 180 and therefore is not involved in the switching state of the switching units used to establish the operational modes of the antenna switching circuit related to transmitting and receiving operational modes.

A first operational mode may be used to operate transmitting and receiving of second transceiving unit 111. Signals received by first antenna 101 and intended for second transceiving unit 111 pass the diplex filtering unit 103 via port 103.1 and port 103.2 and vice versa. As a result, second transceiving unit 111 is connected through diplex filtering unit 103 and integrated switching unit 107 to the first antenna 101 and hence second transceiving unit 111 may transmit and receive by using the first antenna 101 of the antenna system.

A second operational mode may be used to operate transmitting and receiving of signals to/from first transceiving unit 121. For transmitting first switching unit 105 may be preferably switched to connect port 105.1 and port 105.3. As a result, first transceiving unit 121 and second antenna 102 are connected through switching unit 105. The first transceiving unit 121 may transmit and receive using second antenna 102.

Alternatively, first transceiving unit 121 may be operated in combination with first antenna 101 for transmitting and receiving. Therefore, first switching unit 105 is switched to connect port 105.1 and port 105.2. The signals pass through diplex filter 103 via port 103.1 and port 103.3. Integrated switching unit 107 is switched by default to connect port 107.1 and port 107.3. Accordingly, this switching state establishes a connection between first transceiving unit 121 and first antenna 101.

Further, the second operational mode enables to connect first transceiving unit 121 either to first antenna 101 or second antenna 102 and operates therefore the antenna system as a diversity antenna system. The operation of a diversity antenna system is advantageously operated for WLAN transceiving units for receiving due to the intensity differences at different places. The usage of two antennas arranged at different places increases the probability to receive signals transmitted by WLAN transceiving units of sufficient high amplitude. Preferably, the antennas of a diversity antenna system are arranged sufficiently perpendicular to one another since this arrangement may improve the receiving performance.

Usually, WLAN transceiving units transmit signals using a single antenna since the power of WLAN transceiving units for transmitting is high enough and only be limited by type approval limits for transmitting power.

A third operational mode may be used to operate transmitting and receiving of the second transceiving unit 111, whereas first transceiving unit 121 may be operated as receiver unit. In order to establish connections to operate this third operational mode switching unit 105 has to be switched to connect port 105.1 and port 105.3. Accordingly, first transceiving unit 121 is connected to second antenna 102. At the same time, signals intended for second transceiving unit 111 may pass diplex filtering unit 103 via port 103.1 and port 103.2. Correspondingly, second transceiving unit 111 is connected to first antenna 101 via diplex filtering unit 103 and integrated, second switching unit 107. Of course, integrated, switching unit 107 is switched to the default state connecting port 107.1 and port 107.3. This third operational mode may enable transmitting and receiving of both transceiving units at the same time, in case of a low signal coupling between first and second antennas 101 and 102, especially transmitting signals transmitting and receiving of second transceiving unit 111 coupled to first antenna 101 and receiving of first transceiving unit 121 coupled to second antenna 102. Of course, the advantage of a diversity antenna system to improve receiving of first transceiving unit 121 cannot be used in this operational mode. The operation of first transceiving unit 121 is limited to a single second antenna 102. Since second transceiving unit 111 can only be connected to first antenna 101 using antenna switching circuit 501 the operation of second transceiving unit 111 is not limited in this third operational mode.

The states of the switching units may be controlled by the switching control circuit with respect to the different operation modes.

Figure 2:
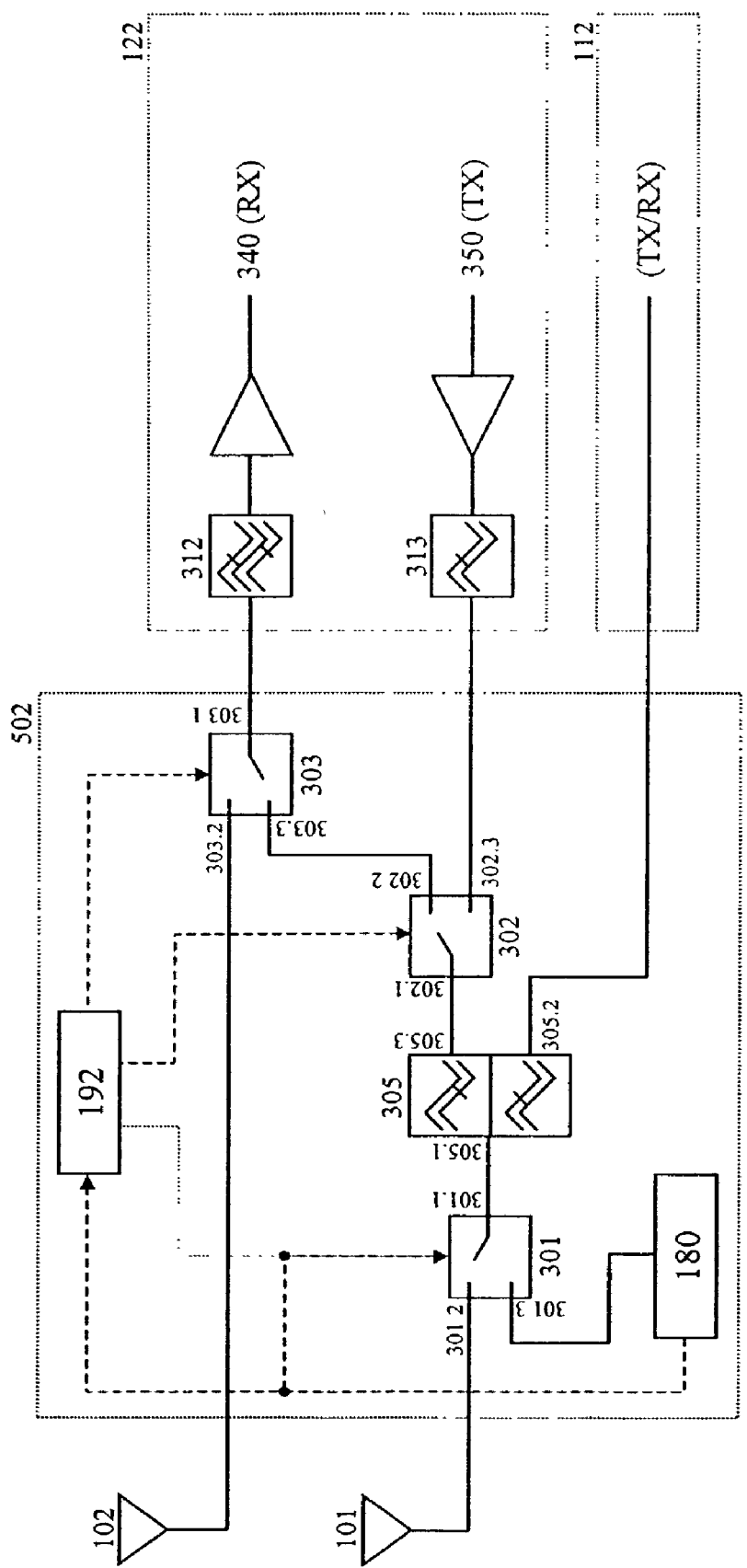
FIG. 2 shows a schematic block diagram illustrating the arrangement of the antenna system, an antenna switching circuit and transceiving units according to a third embodiment of the invention.

FIG. 2 in the following shows another modified antenna switching circuit. FIG. 2 shows a schematic block diagram illustrating the arrangement of the antenna system, an antenna switching circuit and transceiving units according to a third embodiment of the invention. The antenna system comprises two single antennas, i.e., a first antenna 101 and a second antenna 102. The single antennas 101 and 102 may be coupled to the antenna switching circuit 502. Further, two transceivers, i.e., a second transceiver 112 and a first transceiver 122 may be connected to the antenna switching circuit, wherein the transceiving unit 122 may be split into two subunits, i.e., a transmitting subunit 350(TX) and a receiving subunit 340(RX). The transmitting subunit 350 (TX) of the transceiving unit 122 may be coupled to the antenna switching circuit 502 whereas the receiving subunit 340(RX) of the transceiving unit 122 may be coupled separately to the antenna switching circuit 502. The first antenna 101 may be designed to operate as transmitting (TX) and receiving (RX) antenna for the second transceiving unit 112 or first transceiving unit 122, and the second antenna 102 may be designed to operate as receiving (RX) antenna for the first transceiving unit 122.

The transceiving units 112 and 122 may be operated on different frequencies wherein second transceiving unit 112 operates on lower radio frequencies in comparison to first transceiving unit 122 operating on higher radio frequencies. It shall be noted that transceiving unit 112 and 122 may each operate on single different radio frequencies. For example second transceiving unit 112 may be an E-GSM/GSM/DCS transceiving unit. Accordingly, an E-GSM/GSM/DCS transceiving unit may operate on radio frequencies 0.9 GHz, 1.8 GHz and 1.9 GHz wherein the first two radio frequencies are used to operate E-GSM/GSM radio communication and the third radio frequency is used to operated DCS radio communication. First transceiving unit 122 may be a WLAN transceiving unit operating on the ISM band at 2.4 GHz.

The antenna switching circuit 502 may comprise a first switching unit 303, a second switching unit 302, and a third switching unit 301. The switching units may be implemented as single pole double throw switches (SPDT). Additionally, the antenna switching circuit may comprise a common production test RF interface 180 used for testing and tuning the coupled transceiving units 112 and 122 during production. The switching units 301, 302 and 303 may be controlled by a switching control circuit 192.

Preferably, the first switching unit 303 is connected via port 303.1 to receiving subunit 340(RX), via port 303.3 to port 302.2 of second switching unit 302 and via port 303.2 to second antenna 102. The second switching unit 302 is connected via port 302.1 to port 305.3 of diplex filtering unit 302, via port 302.3 to transmitting subunit 350(TX) and via port 302.2 to the port 303.3 of first switching unit 303. The diplex filtering unit 305 is connected via port 305.1 to third switching unit 301, via port 305.2 to transceiving unit 112 and via port 305.3 to port 302.1 of second switching unit 302. The third switching unit 301 is connected via port 301.1 to port 305.1 of diplex filtering unit 305, via port 301.3 to first antenna 101 and via port 301.2 to production test RF interface 180.

The switching control circuit 192 may control the connection state of the switching units and therefore the switching control circuit 192 may enable to operate the antenna switching circuit 502 in different operational modes.

A testing operational mode may be used for testing and tuning the coupled second and first transceiving units 112 and 122. The production test RF interface may be implemented as a mechanical RF connector. Devices for testing and tuning may be connected to the antenna switching circuit 502 via the production test RF interface 180. The third switching unit 301 is switched to connect port 301.1 to port 301.3. The port 301.2 is disconnected and thereupon also first antenna 101. The second transceiving unit 112 may be connected to the production test RF interface through diplex filtering unit 305 via port 305.2 and port 305.1.

Signals intended for second transceiving unit 112 or signals generated by second transceiving unit 112 may pass the diplex filtering unit 305 via port 305.2 and port 305.1. Transmitting subunit 350(TX) of first transceiving unit 122 may be connected with the production test RF interface 180 by second switching unit 302 to connect port 302.3 and port 302.1 and passed through diplex filtering unit 305 via port 305.3 and port 305.1. Receiving subunit 340(RX) of first transceiving unit 122 may be connected with the production test RF interface 180 by first switching unit 303 to connect port 303.1 and port 303.3, second switching unit 302 to connect port 302.2 and port 302.1 and passed through diplex filtering unit 305 via port 305.3 and port 305.1. Signals intended for first transceiving unit 122 or signals generated by first transceiving unit 122 may pass the diplex filtering unit 305 via port 305.3 and port 305.1. Testing and tuning of both transceiving units 112 and 122 may be performed.

Preferably, the switching of the switching units 303, 302 and 301 may be controlled by the switching control circuit 192. More preferably, the integrated switching unit 301 is controlled directly by the production test RF interface 180, for example, in case of plugging in a mechanical plug into the production test RF interface 180 integrated switching unit 301 is switched to connect port 301.1 and port 301.3. If no corresponding plug is connected to the production test RF interface 180 the integrated switching unit 301 is switched to the default switching state connecting port 301.1 and port 301.2.

The following operational modes will describe operational modes of the antenna switching circuits related to transmitting and receiving operation modes of the coupled transceiving units 112 and 122 or the transmitting subunit 350(TX) and receiving subunit 340(RX) of the first transceiving unit 122. During the transceiving unit operation integrated (third) switching unit 301 is switched permanently to connect port 301.1 and port 301.2. Integrated (third) switching unit 301 is employed to implement the production test RF interface 180 and is therefore not involved in the switching state of the switching units used to establish the operational modes of the antenna switching circuit related to transmitting and receiving operational modes.

A first operational mode may be used to operate transmitting and receiving of second transceiving unit 112. Signals received by first antenna 101 and intended for second transceiving unit 112 pass the diplex filtering unit 305 via port 305.1 and port 305.2 and vice versa. As a result, second transceiving unit 112 is connected through diplex filtering unit 305 and integrated (third) switching unit 301 to the first antenna 101 and hence second transceiving unit 112 may transmit and receive by using the first antenna 101 of the antenna system. Preferably, first switching unit 303 is switched connecting port 303.1 and port 303.3 disconnecting port 303.1 to prevent signal power leakage since second antenna 102 is totally disconnected from the receiving subunit 340(RX) of the first transceiving unit 122.

A second operational mode may be used to operate transmitting of transmitting subunit 350(TX) of first transceiving unit 122. For transmitting, second switching unit 302 may be preferably switched to connect port 302.1 and port 302.3. The signals pass through diplex filter 305 via port 305.1 and port 305.3. Integrated (third) switching unit 301 is switched by default to connect port 301.1 and port 301.2. As a result, transmitting subunit 350(TX) of first transceiving unit 122 and first antenna 101 are connected through second switching unit 302. The first transceiving unit 122 may transmit using first antenna 101.

Further, the second operational mode enables to connect receiving unit 340(RX) of first transceiving unit 122 either to first antenna 101 or second antenna 102 and operates therefore the antenna system as a diversity antenna system. The operation of a diversity antenna system is advantageously operated for WLAN transceiving units for receiving due to the intensity differences at different places. The usage of two antennas arranged at different places increases the probability to receive signals transmitted by WLAN transceiving units of sufficient high amplitude. Preferably, the antennas of a diversity antenna system are arranged sufficiently perpendicular to one another since this arrangement may improve the receiving performance. For receiving, second switching unit 302 may be preferably switched to connect port 302.1 and port 302.2. The signals passes through diplex filter 305 via port 305.1 and port 305.3. Integrated (third) switching unit 301 is switched by default to connect port 301.1 and port 301.2. The coupling of first antenna 101 or second antenna 102 to the receiving subunit (340) of first transceiving unit 122 may be controlled by first switching unit 303. If first switching unit 303 is switched to connect port 303.1 and port 303.2, second antenna 102 is connected to receiving subunit 340(RX) of transceiving unit 122. If first switching unit 303 is switched to connect port 303.1 and port 303.3, first antenna 101 is connected to receiving subunit 340(RX) of first transceiving unit 122.

Usually, WLAN transceiving units transmit signals using a single antenna since the power of WLAN transceiving units for transmitting is high enough and is only limited by type approval limits for transmitting power.

A third operational mode may be used to operate transmitting and receiving of the second transceiving unit 112, whereas first transceiving unit 122 may be operated as receiver unit or receiving subunit 340(RX) is operated, respectively. In order to establish connections to operate this third operational mode, first switching unit 303 has to be switched to connect port 303.1 and port 303.2. Accordingly, receiving subunit 340(RX) of first transceiving unit 122 is connected to second antenna 102. At the same time, signals intended for second transceiving unit 112 may pass third switching unit 301 via port 301.2 connected to port 301.1, diplex filtering unit 103 via port 103.1 and port 103.2. Correspondingly, second transceiving unit 112 is connected to first antenna 101 via diplex filtering unit 305 and third switching unit 301. Of course, third switching unit 301 is switched to the default state connecting port 301.1 and port 301.2. This third operational mode may enable transmitting and receiving of second transceiving unit 112 whereas first transceiving unit 122 receives at the same time. Of course, the advantage of a diversity antenna system to improve receiving of first transceiving unit 122 cannot be used in this operational mode. The operation of first transceiving unit 122 is limited to the single, second antenna 102. Since second transceiving unit 112 can only be connected to first antenna 101 using antenna switching circuit 502, the operation of first transceiving unit 112 is not limited in this third operational mode.

The states of the switching units may be controlled by the switching control circuit 192 with respect to the different operational modes.

More preferably, second transceiving unit 112 may be an E-GSM/GSM/DCS transceiving unit for mobile communication. The first transceiving unit 122 may be a WLAN transceiving unit for mobile data communication. Due to the different radio frequency used for communication relating to the standards of the different radio communication systems, first antenna 101 of the antenna system has to operate on all frequencies, i.e., on the GSM frequencies of 900 MHz and 1.8 GHz and on the DCS frequency of 1.9 GHz as also on the WLAN/ISM frequency of 2.4 GHz. The second antenna 102 is designed to operate on the WLAN/ISM frequency of 2.4 GHz and to serve in combination with first antenna 101 as a diversity antenna for the WLAN radio communication system.

Accordingly, the properties of the diplex filtering unit 305 may be adapted to the transceiving unit frequencies. In case of a WLAN (first) transceiving unit 122 and an E-GSM/GSM/DCS (second) transceiving unit 112, signals passing through port 305.1 to port 305.2 of diplex filtering unit 305 may be filtered by a low pass filter adapted to the respective radio frequencies (0.9 GHz, 1.8 GHz or 1.9 GHz) whereas signal passing through port 305.1 and port 305.3 of the diplex filtering unit may be filtered by a high pass filter adapted to the respective radio frequency (2.4 GHz). The diplex filtering unit separates signals designated to the E-GSM/GSM/DCS transceiving unit and WLAN transceiving unit.

Signal losses are obviously higher for signals originating in first antenna 101 in comparison to signals originating in second antenna 102 due to the number of electrical components. This aspect does not restrict the operation of the WLAN system due to the fact that the transmission subunit 350(TX) of the WLAN (second) transceiving unit 112 may be realised providing enough signal power to reach the approval radiation power limit despite of the design according to FIG. 2. If the coupling between first antenna 101 and second antenna 102 is found to be low enough this circuit enables true dual mode operation of the GSM/E-GSM (second) transceiving unit 112 for transmitting and receiving and operation of the receiving subunit 340(RX) of the WLAN (first) transceiving unit 122 for receiving or monitoring the WLAN traffic on the ISM band simultaneously.

This embodiment of the controlling circuit does not enable the usage of a diversity antenna system for WLAN transmission operation. This should not be considered a problem since the actually radiated signal power including antenna gain is limited by type approval and transmitting subunit 350(TX) of the WLAN transceiving unit 122 is efficient enough to reach the type approval limit using a single antenna. Of course the diversity antenna system can be realised extending the circuit by integrating an additional switch connecting second antenna 102. Disadvantageously, this configuration would add attenuation on both transmitting subunit 350(TX) of the WLAN (first) transceiving unit 122 and receiving subunit 340(RX) of the WLAN (first) transceiving unit 122 and limit the gain on second antenna 102 used for signal receive of WLAN signals. The diversity selection is carried out by the first switch 303. Since second antenna 102 is only employed for WLAN radio operation its characteristics are optimised for 2.4 GHz WLAN radio frequency operation whereas first antenna 101 is designed to be employed during GSM/E-GSM radio operation and WLAN radio operation.

Preferably, a mechanical switching unit may be implemented advantageously integrated in the E-GSM/WLAN connector 180 to reduce production costs. The second and first switching units 302 and 303 may have to be controlled electrically so that preferentially electrically controlled radio frequency (RF) switches are used. Further preferably, the antenna switching circuit may be designed using semiconductor switches, ceramic filters and a mechanical GSM/WLAN testing connector 180 including a third switching unit 301. RF switching units and filtering units employed for this controlling circuit are state of the art components and not described in detail in the present invention.

Further filtering units may be implemented in the antenna switching circuit to improve the signal quality.

The subunits 340(RX) and 350(TX) of the WLAN (first) transceiving unit 122 may include additional filtering units 312 and 313. Filtering unit 312 may be interposed between the first switching unit 303 and the receiving subunit 340 and may be a bandpass filtering unit 312, whereas filtering unit 313 may be interposed between the second switching unit 302 and the transmitting subunit 350 and may be a lowpass filtering unit 313. The usage of only a lowpass filter unit 313 is possible, since signals generated by the transmitting subunit 350(TX) pass the diplex filtering unit 305. The diplex filtering unit provides a highpass filtering unit for signals passing through port 305.3 to 305.1 and vice versa. Therefore, a lowpass filtering unit 313 applied to the transmitting unit 350(TX) may be sufficient to filter the signals, since the combination of the lowpass filtering unit 313 and the diplex filtering unit 305 (port 305.3 to port 305.1) represent a bandpass filtering unit adapted to the transmitting subunit 350(TX) of the WLAN (first) transceiving unit 122. The filtering unit 312 may have to be a bandpass filtering unit 312, since the receiving subunit 340(RX) receives signals from first antenna 101 and second antenna 102. Signals received by second antenna 102 do not pass the diplex filtering unit 305, so that they may have to be filtered by a bandpass filter applied to the receiving subunit 340(RX) of the WLAN transceiving unit 122.

Figure 3:
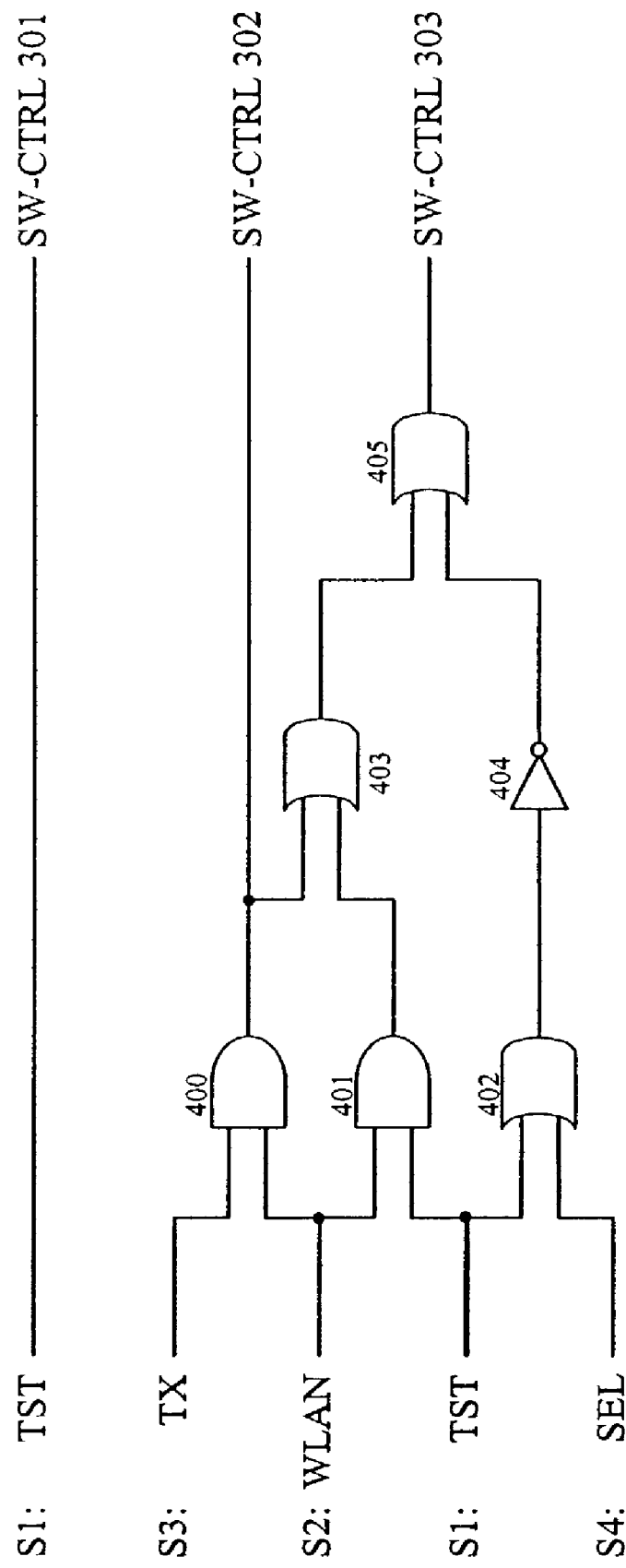
FIG. 3 shows schematically a logic circuit diagram with respect to the switch control circuit of the antenna switching circuit according to FIG. 2.

The operation of the embodiment according to the invention illustrated in FIG. 2 can be clearly understood in connection with the signal description and the switching truth table shown in FIG. 4*a*, FIG. 4*b* and FIG. 5*a*, FIG. 5*b*, respectively, in conjunction with the antenna switching logic operation effected by the logic circuit shown in FIG. 3 as it relates to the control circuit 192 in FIG. 2 thereof. In this connection, referring to FIG. 5*a* and FIG. 5*b*, when the logic value of the switching units 301, 302, 303 is at logic 0, port 1 and port 2 of the respective switching units 301, 302 and 303 are connected through. Otherwise at logic value 1, port 1 and port 3 of the respective switching units 301, 302 and 303 are connected through. Four controlling signals may be used to control the antenna switching circuit. A signal TST enables to distinguish between testing operation and normal operation of the transceiving units. TST at logic value 1 means that the antenna switching circuit is operated in the testing operation mode, whereas TST at logic value 0 means that the antenna switching circuit is operated in order to allow transceiving of the transceiving units. A signal WLAN enables to control if the antenna switching circuit enables operation of the WLAN (first) transceiving unit 122 or the GSM (second) transceiving unit 112, respectively. The WLAN operation of WLAN (first) transceiving unit 122 may have assigned the logic value 1, the GSM (second) transceiving unit 112 the logic value 0. A Signal TX may control if the WLAN transceiving unit 122 transmits or receives signals. Accordingly, at logic value 1 the antenna switching circuit operates in transmitting operation mode whereas at logic value 0 the antenna switching circuit operates in receiving operation mode. In WLAN receiving operation mode (signal WLAN at logic value 1, signal TX at logic value 0) a signal SEL enables to select the receiving antenna due to the diversity antenna operation in this mode. At logic value 0 antenna 101 is operated as receiving antenna whereas at logic value 1 antenna 102 is operated as receiving antenna.

Additionally, FIG. 4*a* and FIG. 4*b* show a possible truth table according to FIG. 3 based on the controlling signal described above. The signal values of the controlling signals as also the switching unit states are given in this truth table.

FIG. 3 shows schematically a logic circuit diagram with respect to the switch control circuit of the antenna switching circuit according to FIG. 2. FIG. 3 is an example of the control circuit 192 (although not limited thereto). The control of the three switching units may be achieved with relatively few logic gates, namely, AND gates 400 and 401, OR gates 402, 403 and 405 and inverter 404. In this connection, it is noted that each signal line associated with control circuit 192, pertains to a complementary pair of control signal lines such as shown in FIG. 3. Incidentally, a similar such logic gate arrangement can be effected with regard to control circuits for switching unit control in FIG. 1*a* and FIG. 1*b*. Also, using low power consumption logic to control the switching units instead of direct control of the switching units by individual settings specific thereto, assures that only those described combinations of switching unit settings are made possible.

Figure 6A:
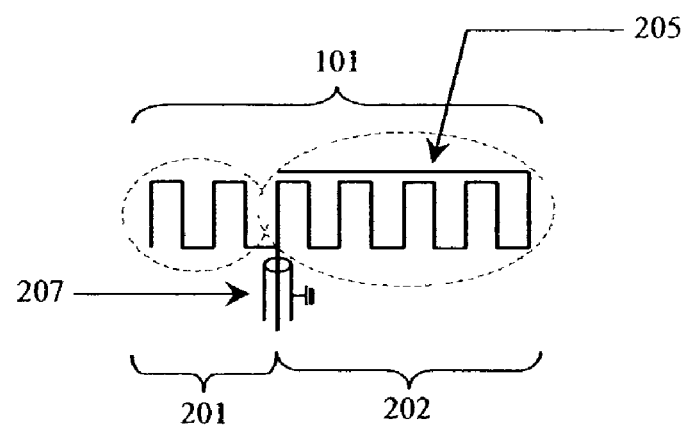
FIG. 6a shows the main antenna of the antenna system according to a further embodiment of the invention and FIG. 6b shows the arrangement of the antenna system according to a further embodiment of the invention on an printed wired board used for an interface PCMCIA/PC-CARD.

FIG. 6*a* shows one of the antennas of the antenna system of the present invention. The antenna shown is the main antenna used for E-GSM/DCS communication and WLAN/ISM communication. The feedpoint of the antenna is placed substantially in the middle of the antenna structure. The left and right side structure parts relating to the feed point are connected galvanically and parasitically to each other. According to the operation frequency the length of the left antenna structure side is adapted for WLAN operation on the ISM band, i.e., at a resonant frequency of 2.4 GHz. The right side of the antenna structure relating to the feed point of the antenna is prepared for operation on the E-GSM/DCS frequencies, i.e., on the E-GSM/GSM frequencies of 900 MHz and 1.8 GHz and on the DCS frequency of 1.9 GHz. The antenna structure itself consists of a normal meander line including a feedback line. The design of the E-GSM/DCS structure part of the main antenna is carried out according to dual or triple band antennas which are described in several patents such as EP 0 923 158 A2 or EP 0 938 158 A2.

The lower frequency of the E-GSM/DCS antenna part is determined mainly by the physical length on the distance of the antenna to the nearest grounded structure whereas the higher frequencies is determined mainly by the feedback line. Additional resonant frequencies at high frequencies can be controlled by the employment of parasitic elements.

Figure 6B:
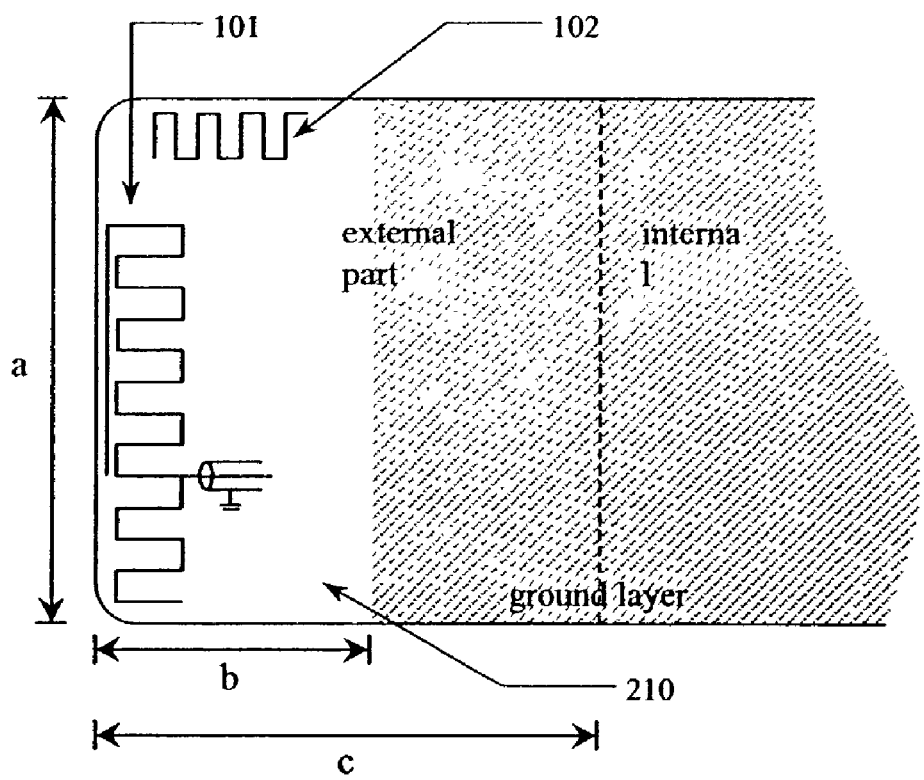
Figure 1A:
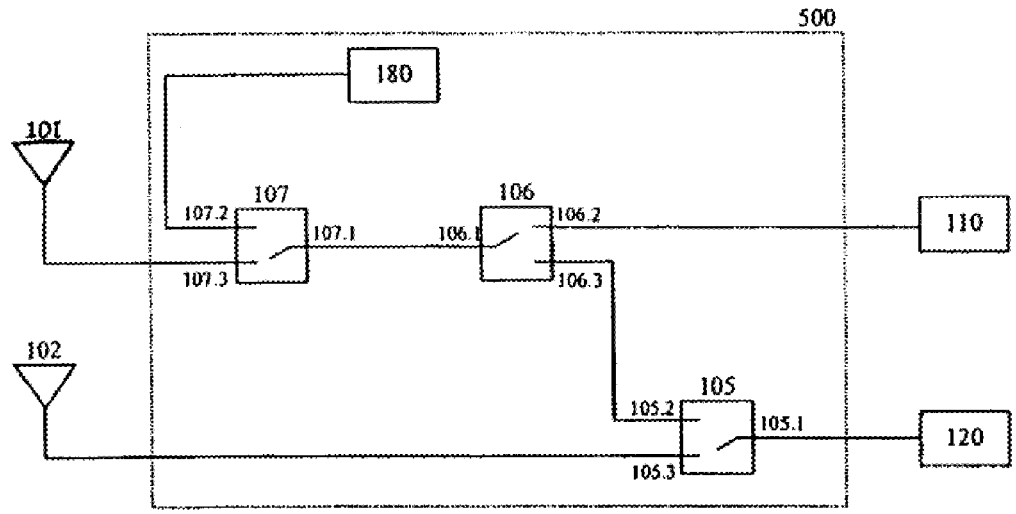
Figure 1B:
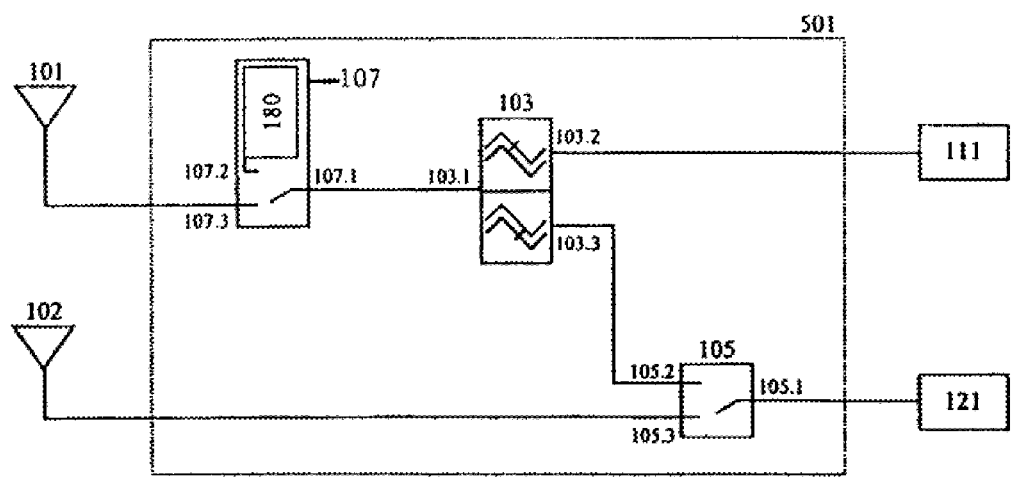
Figure 3:
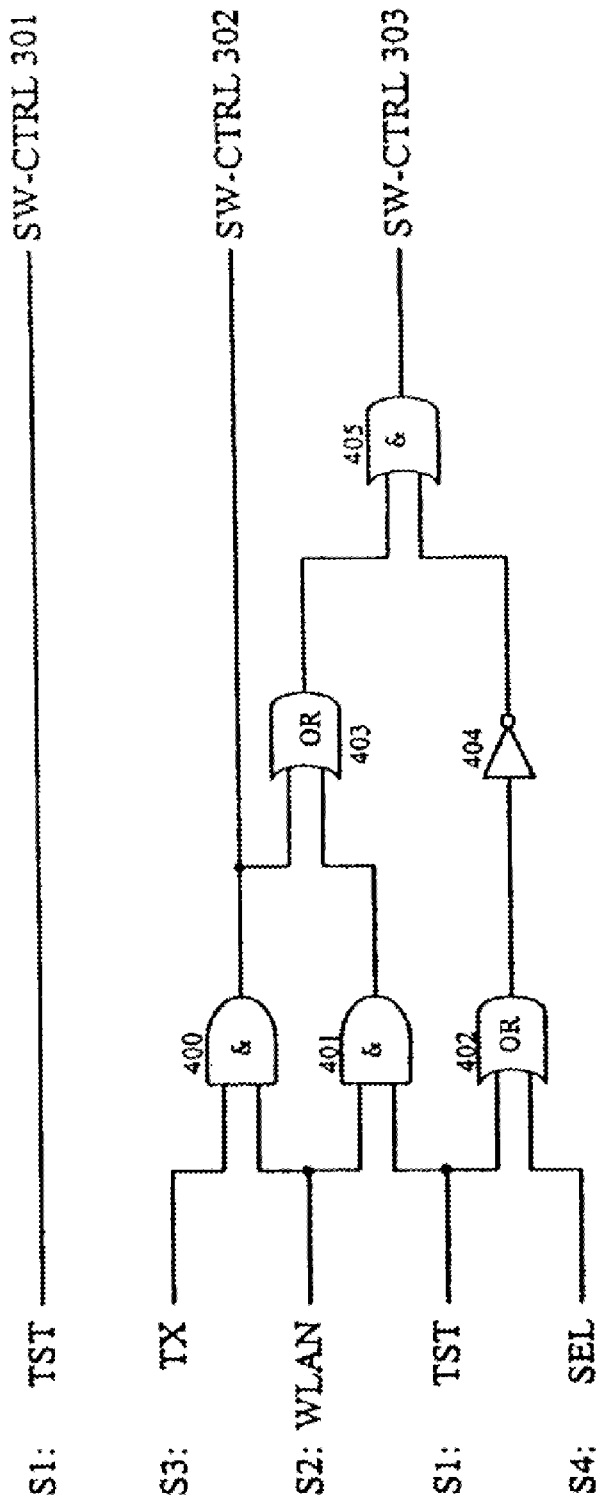

FIG. 6*b* shows the arrangement of the antenna structure on a printed wired board (PWB) 210, sometimes called a printed circuit board (PCB). The main (first) antenna 101 described in FIG. 2 is placed vertically near the left edge of the PWB 210 so that the WLAN/ISM antenna part is placed near the left lower corner. The second antenna 102 for diversity operation of the WLAN/ISM communication is placed near the upper edge and near the left upper corner. This arrangement of the antennas for diversity operation ensures sufficient distance thereof. Both antennas are placed on the same side of the PWB 210. Advantageously, by placing the antennas near the edges and corners of the PWB 210 it is possible to employ FR4 substrate, a cheap and easy available substrate material with excellent mechanical properties used for manufacturing PWBs although it is not used conventionally for PWBs systems operating at microwave frequencies due to high losses at these frequencies. For high density microwave circuits where path lengths are short and for broadband antenna elements, where losses and absolute dielectric constant values are less critical, the material could be used instead of more conventional substrate material, offering significant cost saving.

As described above, the low resonant frequency of the E-GSM/DCS antenna structure part is determined by the distance of the antenna to the next ground plane of the PWB 210 in order to prevent a coupling to the ground layer. This distance is marked as distance b and should not below 15 mm.

The schematic view in FIG. 6*b* shows the arrangement of the antenna structure used in a PCMCIA/PCCARD especially for mobile devices containing a PCMCIA/PCCARD interface. The design of the PWB 210 supporting the antenna system according to the present invention has also to consider the distance to the device housing to ensure sufficient distance between antennas and conductor to prevent any type of coupling effects. Therefore, the antenna system is placed inside an external plastic housing part of the PCMCIA/PCCARD extending out of the PCMCIA/PCCARD interface insertion. This external plastic housing part has a size at least of 40 mm relating to distance a to 50 mm relating to distance c. The properties of the FR4 substrate material employed for the PWB 210 and the size and height of the antenna system placed on the PWB 210 enables to use a low-profile extension housing of the height of only 5 mm.

The invention claimed is:

1. A transceiving antenna system comprising a first antenna, a second antenna and a controlling circuit to operate a first transceiving unit and a second transceiving unit, wherein said first antenna is operated in combination with said second antenna in a first operational mode to serve as a diversity transceiving antenna system for said first transceiving unit, and said first antenna is operated in a second operational mode to serve as a single transceiving antenna for said second transceiving unit, wherein said controlling circuit is configured to selectively connect said first antenna and said second antenna to said first transceiving unit operating in said first operational mode, and only said first antenna with said second transceiving unit in said second operational mode, and the system further comprises a testing interface for operating in testing modes, wherein said controlling circuit is configured to selectively connect said testing interface to said first transceiving unit in a first testing mode, and said testing interface to said second transceiving unit in a second testing mode, said controlling circuit comprises a first switching unit, a second switching unit and a third switching unit, said first switching unit is connected to said first transceiving unit, said second antenna and said second switching unit, said second switching unit is connected to said second transceiving unit, said first switching unit and said third switching unit, said third switching unit is connected to said second switching unit, said testing interface and said first antenna.

2. A transceiving antenna system comprising a first antenna, a second antenna and a controlling circuit to operate a first transceiving unit and a second transceiving unit, wherein said first antenna is operated in combination with said second antenna in a first operational mode to serve as a diversity transceiving antenna system for said first transceiving unit, and said first antenna is operated in a second operational mode to serve as a single transceiving antenna for said second transceiving unit, wherein said controlling circuit is configured to selectively connect said first antenna and said second antenna to said first transceiving unit operating in said first operational mode, and only said first antenna with said second transceiving unit in said second operational mode, and the system further comprises a testing interface for operating in testing modes, wherein said controlling circuit is configured to selectively connect said testing interface to said first transceiving unit in a first testing mode, and said testing interface to said second transceiving unit in a second testing mode, said controlling circuit comprises a first switching unit, a second switching unit and a diplex filtering unit, said diplex filtering unit is connected to said second transceiving unit, said first switching unit and said second switching unit, said first switching unit is connected to said first transceiving unit, said second antenna and said diplex filtering unit, and said second switching unit is connected to said diplex filtering unit, said testing interface and said first antenna.

3. A transceiving antenna system comprising a first antenna, a second antenna and a controlling circuit to operate a first transceiving unit and a second transceiving unit, wherein said first antenna is operated in combination with said second antenna in a first operational mode to serve as a diversity transceiving antenna system for said first transceiving unit, and said first antenna is operated in a second operational mode to serve as a single transceiving antenna for said second transceiving unit, wherein said controlling circuit is configured to selectively connect said first antenna and said second antenna to said first transceiving unit operating in said first operational mode, and only said first antenna with said second transceiving unit in said second operational mode, and the system further comprises a testing interface for operating in testing modes, wherein said controlling circuit is configured to selectively connect said testing interface to said first transceiving unit in a first testing mode, and said testing interface to said second transceiving unit in a second testing mode, and wherein said controlling circuit comprises a first switching unit, a second switching unit, a third switching unit and a diplex filter, said first transceiving unit comprises a transmitting subunit and a receiving subunit, said first switching unit is connected to said receiving subunit, said second switching unit and said second antenna, said second switching unit is connected to said first switching unit, said transmitting subunit and said diplex filtering unit, said diplex filtering unit is connected to said second switching unit, said second transceiving unit and said third switching unit, and said third switching unit is connected to said diplex filtering unit, said testing interface and said first antenna.

4. Method for operation of an antenna system comprising a first antenna, a second antenna, a controlling circuit, a first transceiving unit, a second transceiving unit and a testing interface, comprising:

said controlling circuit selectively connecting said first antenna and said second antenna to said first transceiving unit for operating said first antenna in combination with said second antenna to serve as a diversity transceiving antenna system for said first transceiving unit in a first operational mode;

said controlling circuit selectively connecting only said first antenna with said second transceiving unit for operating said first antenna as a single transceiving antenna for said second transceiving unit in a second operational mode;

said controlling circuit selectively connecting said testing interface to said first transceiving unit for operating in a first testing mode; and said controlling circuit selectively connecting said testing interface to said second transceiving unit in a second testing mode;

wherein said controlling circuit comprises a first switching unit, a second switching unit and a third switching unit; said first switching unit is connected to said first transceiving unit, said second antenna and said second switching unit, said second switching unit is connected to said second transceiving unit, said first switching unit and said third switching unit, and said third switching unit is connected to said second switching unit, said testing interface and said first antenna; and the method further comprises:

configuring the first, the second and the third switching units so that the first antenna and the second antenna are each connected to the first transceiving unit for operating said first antenna in combination with said second antenna to serve as a diversity transceiving antenna system for said first transceiving unit in the first operational mode;

configuring the first, second and the third switching units so that only said first antenna is connected with the second transceiving unit for operating said first antenna as a single transceiving antenna for said second transceiving unit in the second operational mode;

configuring the first, the second and the third switching units so that said testing interface is connected to said first transceiving unit for operating in the first testing mode; and configuring the first, the second and the third switching units so that said testing interface is connected to said second transceiving unit in the second testing mode.

5. Method for operation of an antenna system comprising a first antenna, a second antenna, a controlling circuit, a first transceiving unit, a second transceiving unit and a testing interface, comprising:

said controlling circuit selectively connecting said first antenna and said second antenna to said first transceiving unit for operating said first antenna in combination with said second antenna to serve as a diversity transceiving antenna system for said first transceiving unit in a first operational mode;

said controlling circuit selectively connecting only said first antenna with said second transceiving unit for operating said first antenna as a single transceiving antenna for said second transceiving unit in a second operational mode;

said controlling circuit selectively connecting said testing interface to said first transceiving unit for operating in a first testing mode; and said controlling circuit selectively connecting said testing interface to said second transceiving unit in a second testing mode;

wherein said controlling circuit comprises a diplex filtering unit interconnected between said first antenna, said first transceiving unit and said second transceiving unit;

wherein said controlling circuit comprises a first switching unit, a second switching unit and said diplex filtering unit, said diplex filtering unit is connected to said second transceiving unit, said first switching unit and said second switching unit, said first switching unit is connected to said first transceiving unit, said second antenna and said diplex filtering unit, said second switching unit is connected to said diplex filtering unit, said testing interface and said first antenna; and the method further comprises:

configuring the first and the second switching units so that the first antenna and the second antenna are each connected to the first transceiving unit for operating said first antenna in combination with said second antenna to serve as a diversity transceiving antenna system for said first transceiving unit in the first operational mode;

configuring the first and the second switching units so that only said first antenna is connected with the second transceiving unit for operating said first antenna as a single transceiving antenna for said second transceiving unit in the second operational mode;

configuring the first and the second switching units so that said testing interface is connected to said first transceiving unit for operating in the first testing mode; and configuring the first and the second switching units so that said testing interface is connected to said second transceiving unit in the second testing mode.

6. Method for operation of an antenna system comprising a first antenna, a second antenna, a controlling circuit, a first transceiving unit, a second transceiving unit and a testing interface, comprising:

said controlling circuit selectively connecting said first antenna and said second antenna to said first transceiving unit for operating said first antenna in combination with said second antenna to serve as a diversity transceiving antenna system for said first transceiving unit in a first operational mode;

said controlling circuit selectively connecting only said first antenna with said second transceiving unit for operating said first antenna as a single transceiving antenna for said second transceiving unit in a second operational mode;

said controlling circuit selectively connecting said testing interface to said first transceiving unit for operating in a first testing mode; and said controlling circuit selectively connecting said testing interface to said second transceiving unit in a second testing mode;

wherein said controlling circuit comprises a first switching unit, a second switching unit, a third switching unit and a diplex filtering unit, said first transceiving unit comprises a transmitting subunit and a receiving subunit, said first switching unit is connected to said receiving subunit, said second switching unit and said second antenna, said second switching unit is connected to said first switching unit, said transmitting subunit and said diplex filtering unit, said diplex filtering unit is connected to said second switching unit, said second transceiving unit and said third switching unit, said third switching unit is connected to said diplex filtering unit, said testing interface and said first antenna; and the method further comprises:

configuring the first, the second and the third switching units so that the first antenna is connected to the transmitting subunit and the second antenna is connected to the receiving subunit for operating said first antenna in combination with said second antenna to serve as a diversity transceiving antenna system for said first transceiving unit in the first operational mode;

configuring the first, the second and the third switching units so that only said first antenna is connected with the second transceiving unit for operating said first antenna as a single transceiving antenna for said second transceiving unit in the second operational mode;

configuring the first, the second and the third switching units so that said testing interface is connected to said transmitting subunit or said receiving subunit for operating in the first testing mode; and configuring the first, the second and the third switching units so that said testing interface is connected to said second transceiving unit in the second testing mode.

* * * * *

UNITED STATES PATENT AND TRADEMARK OFFICE
CERTIFICATE OF CORRECTION

PATENT NO. : 7,239,889 B2
APPLICATION NO. :10/287435
DATED : July 3, 2007
INVENTOR(S) : Saari et al.

It is certified that error appears in the above-identified patent and that said Letters Patent is hereby corrected as shown below:

Delete Title page illustrating a figure(s), and substitute therefor, new Title page illustrating a figure(s). (attached)

Delete drawing sheets 1,3 and 5, and substitute therefor drawing sheets 1, 3, and 5. (attached)

Signed and Sealed this

Seventeenth Day of June, 2008

JON W. DUDAS
*Director of the United States Patent and Trademark Office*

(12) United States Patent
Saari et al.

(10) Patent No.: US 7,239,889 B2
(45) Date of Patent: Jul. 3, 2007

(54) ANTENNA SYSTEM FOR GSM/WLAN RADIO OPERATION

(75) Inventors: Timo Saari, Tampere (FI); Ari Väisänen, Ruutana (FI); Marko Puupponen, Tampere (FI)

(73) Assignee: Nokia Corporation, Espoo (FI)

(*) Notice: Subject to any disclaimer, the term of this patent is extended or adjusted under 35 U.S.C. 154(b) by 495 days.

(21) Appl. No.: 10/287,435

(22) Filed: Oct. 31, 2002

(65) Prior Publication Data
US 2003/0124982 A1 Jul. 3, 2003

(30) Foreign Application Priority Data
Oct. 31, 2001 (EP) ................ 01126010

(51) Int. Cl.
H04M 1/00 (2006.01)
H03B 1/62 (2006.01)
H03C 1/62 (2006.01)

(52) U.S. Cl. ............. 455/552.1; 455/553.1; 455/101; 455/115.1; 455/132; 455/140

(58) Field of Classification Search ........ 455/552.1, 455/553.1, 101, 115.1, 132, 133, 140, 272, 455/277, 423–425, 77–78, 82–83, 88
See application file for complete search history.

(56) References Cited

U.S. PATENT DOCUMENTS

| 5,337,316 A | 8/1994 | Weiss et al. ............. 371/20.5 |
| 5,550,554 A * | 8/1996 | Erkocevic ............. 343/828 |
| 5,710,984 A * | 1/1998 | Millar et al. ............. 455/80 |
| 6,115,585 A * | 9/2000 | Matero et al. ............. 455/78 |
| 6,125,107 A * | 9/2000 | Johnson et al. ............. 370/241 |
| 6,127,986 A * | 10/2000 | Wen et al. ............. 455/293 |
| 6,266,026 B1 | 7/2001 | Stengel, Jr. ............. 343/791 |
| 6,509,877 B2 * | 1/2003 | Masaki ............. 375/347 |
| 6,510,310 B1 * | 1/2003 | Muralidharan ............. 455/83 |
| 6,560,443 B1 * | 5/2003 | Vaisanen et al. ............. 455/73 |
| 6,714,773 B1 * | 3/2004 | Ishida ............. 455/272 |

FOREIGN PATENT DOCUMENTS

| EP | 0623957 | 11/1994 |
| EP | 0865169 | 9/1998 |
| EP | 0866588 | 9/1998 |
| EP | 0923158 | 6/1999 |
| EP | 0938158 | 8/1999 |
| EP | 1083622 | 3/2001 |
| GB | 2355155 | 4/2001 |
| WO | 0076095 | 12/2000 |
| WO | 0150636 | 7/2001 |
| WO | 0159938 | 8/2001 |

* cited by examiner

Primary Examiner—Lana Le
Assistant Examiner—Wen Huang
(74) Attorney, Agent, or Firm—Ware, Fressola, Van Der Sluys & Adolphson

(57) ABSTRACT

An antenna system with two antennas provides the possibility to operate at least two different radio communication systems with one radio communication system operating on one single antenna of the antenna system and another radio communication system operating on both antennas of the antenna system wherein the antenna system serves as a diversity antenna system. This kind of antenna system is designed to be employed particularly in small devices with restricted measurements. Especially, an implementation of an antenna system for dual use of GSM/E-GSM/DCS operation and WLAN operation is presented.

6 Claims, 6 Drawing Sheets

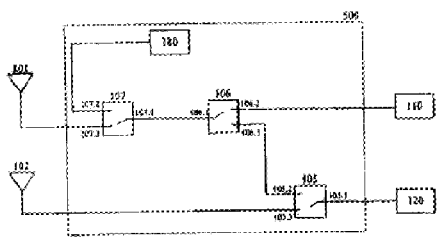

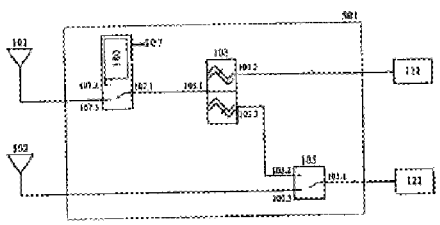

| SIGNAL | VALUE | FUNCTION |
|---|---|---|
| TST | 0 | GSM/WLAN transceiver operation mode |
| | 1 | production test operation mode |
| WLAN | 0 | GSM mode |
| | 1 | WLAN mode |
| TX | 0 | receive mode |
| | 1 | transmit mode |
| SEL | 0 | GSM mode: only GSM operation<br>WLAN RX: Antenna 101 |
| | 1 | GSM mode: simultaneous operation GSM / WLAN RX<br>WLAN RX: Antenna 102 |

Fig. 5a

| INPUT | VALUE | SWITCH SETTING |
|---|---|---|
| 301 | 0 | 301.1 and 301.2 connected; 301.3 disconnected |
| | 1 | 301.1 and 301.3 connected; 301.2 disconnected |
| 302 | 0 | 302.1 and 302.2 connected; 302.3 disconnected |
| | 1 | 302.1 and 302.3 connected; 302.2 disconnected |
| 303 | 0 | 303.1 and 303.2 connected; 303.3 disconnected |
| | 1 | 303.1 and 303.3 connected; 303.2 disconnected |

Fig. 5b